Dec. 29, 1925.
C. A. FLEMING
1,567,936
TRACTOR SWEEP RAKE
Filed March 13, 1924
3 Sheets-Sheet 2
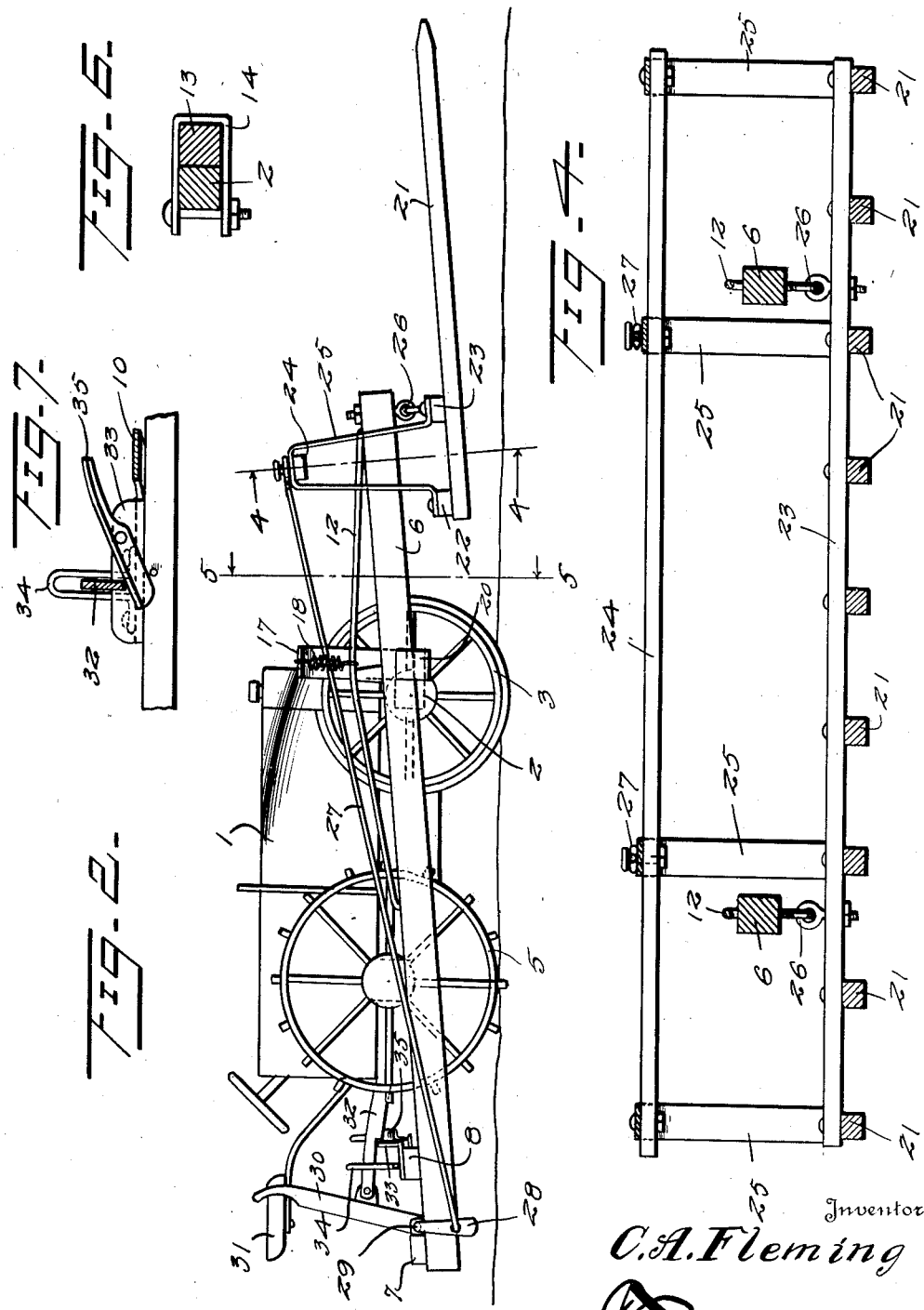

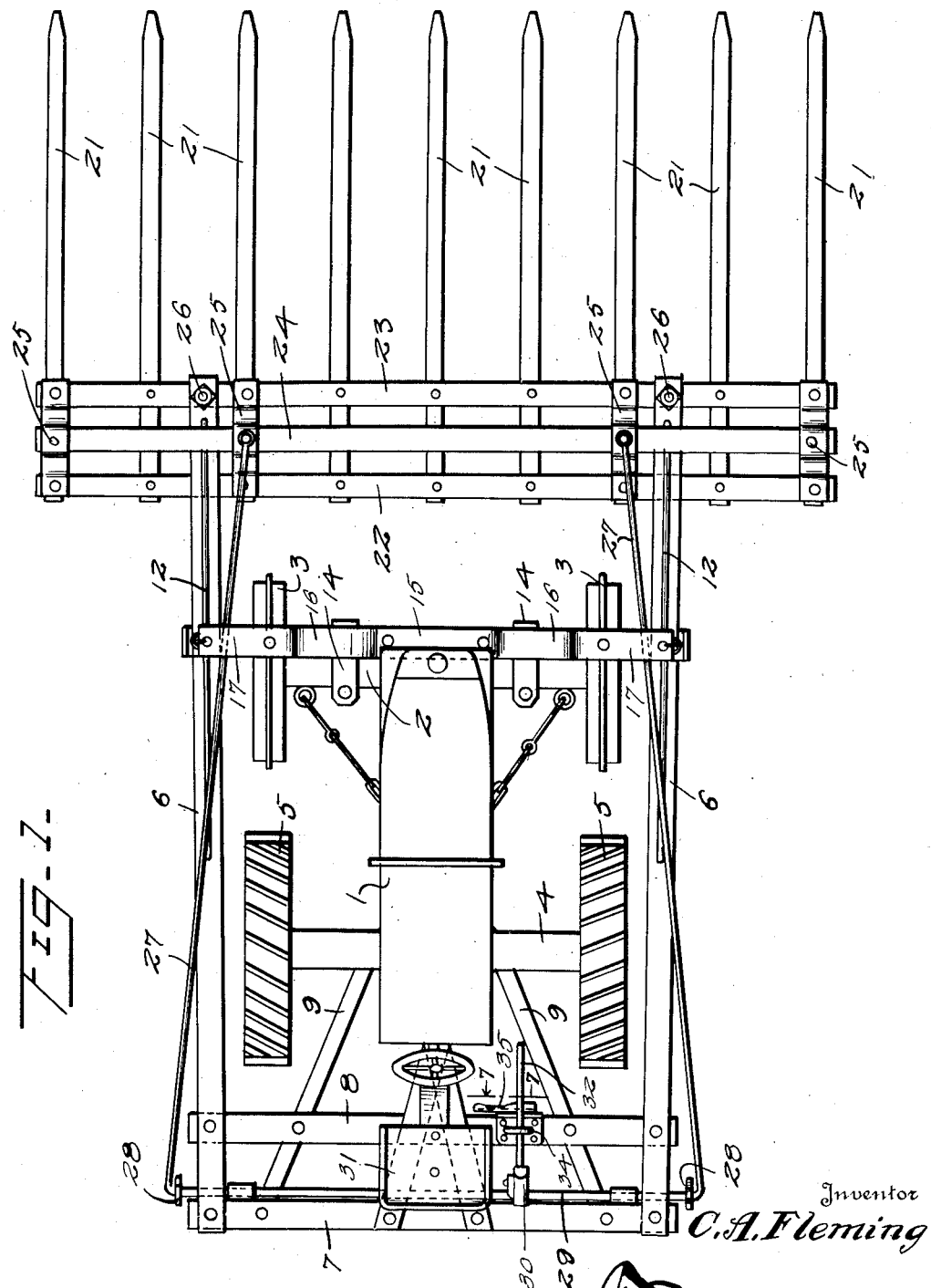

Dec. 29, 1925.  
C. A. FLEMING  
TRACTOR SWEEP RAKE  
Filed March 13, 1924  
1,567,936  
3 Sheets-Sheet 3
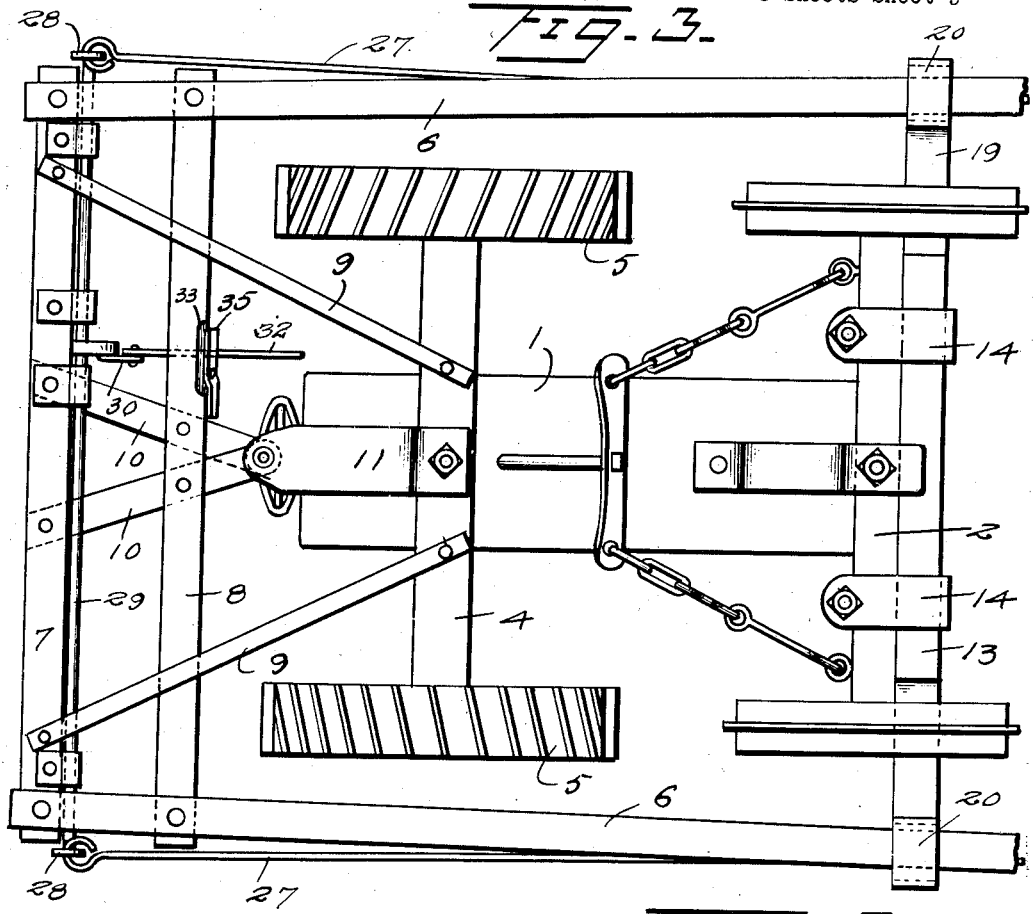
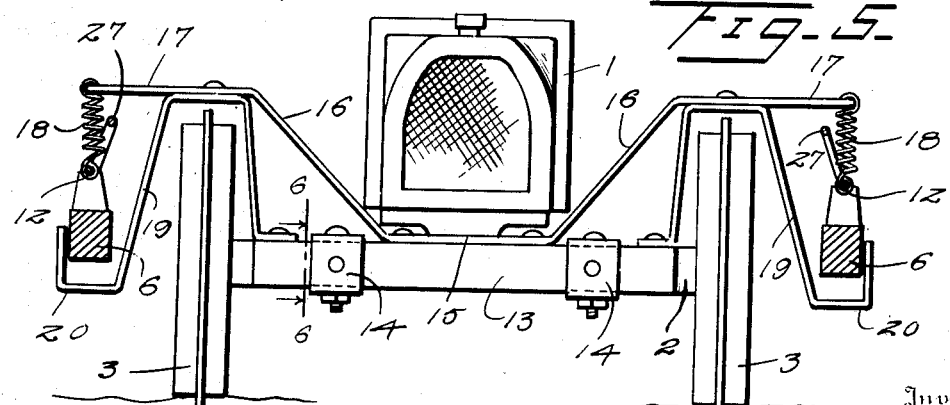

Patented Dec. 29, 1925.

1,567,936

UNITED STATES PATENT OFFICE.

CLIFFORD A. FLEMING, OF HUNTSVILLE, MISSOURI.

TRACTOR SWEEP RAKE.

Application filed March 13, 1924. Serial No. 699,021.

*To all whom it may concern:*

Be it known that I, CLIFFORD A. FLEMING, a citizen of the United States, residing at Huntsville, in the county of Randolph and State of Missouri, have invented certain new and useful Improvements in Tractor Sweep Rakes; and I do hereby declare the following to be a full, clear, and exact description of the invention, such as will enable others skilled in the art to which it appertains to make and use the same.

The invention has relation to agricultural implements and to such as are designed for gathering the crop. The invention specifically relates to a rake and aims to provide a device of this character which may be mounted upon and carried by a tractor and directed in its movements thereby, said rake being wholly devoid of supporting wheels since it is constructed to be attached to a tractor and carried thereby, hence the rake may be detached from the tractor and stowed away when not required for immediate service, thereby admitting of the tractor being utilized in a general way for a variety of functions.

A further purpose of the invention is to minimize the cost of equipment and to provide a rake which partakes of the nature of an attachment since it is adapted to be readily applied to a tractor when required for service and detached therefrom and conveniently stowed away when not required for immediate service.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of a rake embodying the invention and showing the same applied to a tractor, Figure 2 is a side view thereof, Figure 3 is an inverted or bottom view, showing the parts on a larger scale and having the rake broken away, Figure 4 is an enlarged sectional view on the line 4—4 of Figure 2, looking towards the front as indicated by the arrows, Figure 5 is a sectional view on the line 5—5 of Figure 2, looking towards the rear as designated by the arrows, Figure 6 is a detail sectional view on the line 6—6 of Figure 5, and Figure 7 is an enlarged detail sectional view on the line 7—7 of Figure 1.

Corresponding and like parts are referred to in the following description and designated in the several views of the drawings by like reference characters.

The tractor illustrated is of conventional form and is shown to demonstrate the application of the invention and comprises generally a body 1, a front axle 2 provided with supporting wheels 3 and a rear axle 4 provided with drive wheels 5.

The rake includes a frame having longitudinal bars 6 which are transversely spaced a distance so as to clear the wheels of the tractor. Spaced transverse bars 7 and 8 connect the rear ends of the longitudinal bars 6. Braces 9, attached to the transverse bars 7 and 8, extend forwardly and pass beneath the rear axle 4, to which they may be attached in any preferred way. The arrangement of the braces 9 insures maintaining the rake in proper position and prevents the rear portion of the frame tilting upwardly when the rake is loaded. Straps 10 attached to the transverse bars 7 and 8 also extend forwardly and are connected to the hitch 11 which is connected to the rear axle 4. The braces 9 and the straps 10 are forwardly converged and coact to hold the frame in square. Truss braces 12 strengthen the longitudinal bars 6 and obviate the necessity for making the same heavy and cumbersome.

A bracket is disposed transversely of the tractor and is made fast to the front axle 2 in any preferred way and this bracket provides supporting means for the rake and the front ends of longitudinal bars 6 of the main frame. This bracket comprises a crossbar 13 which is secured to the axle 2 by means of clips 14. A crossbrace 15 is bolted or otherwise secured to the crossbar 13 and its end portions incline upwardly and outwardly, as indicated at 16, thence horizontally, as shown at 17. The horizontal portions 17 overhang the wheels 3 and their outer ends are connected to the truss braces 12 by means of helical springs 18. These springs yieldably support the rake and the front ends of the longitudinal bars 6. Inverted U-shaped standards 19 are secured to the crossbar 13 and end portions 17 of the crossbrace 15 and straddle the wheels 3 and their lower outer ends terminate in hooks or stirrups 20 which coact with the longitudinal bars 6 to prevent lateral displacement thereof and to limit their downward movement and prevent overstraining of the springs 18 when the rake is heavily loaded. It is also observed that the springs 18 operate as shock absorbers and yieldably support a normal load.

The rake comprises teeth 21 and a head, the latter including crossbars 22, 23 and 24 and a plurality of standards 25, the latter connecting the lower crossbars 22 and 23 with the upper crossbar 24. A loose connection 26 pivotally connects the rake to the front ends of the longitudinal bars 6, thereby admitting of the rake having a tilting movement whereby the front ends of the teeth 21 may be moved towards or away from the surface of the ground. Rods 27 connect the upper ends of certain standards 25 with arms 28 at the ends of a transverse shaft 29 mounted in bearings applied to the transverse bar 7. An operating lever 30 fast to the shaft 29 extends within convenient reach of the driver's seat 31 and is adapted to be operated to effect a tilting of the rake. A dog 32 pivoted to the lever 30 is adapted to coact with a stop plate 33 to hold the rake in a given position. A keeper 34 mounted upon the transverse bar 8 coacts with the dog 32 to hold it in proper position. A trip lever 35 pivoted to the stop plate 33 has an end portion extending beneath the dog 32 and provides convenient means for releasing the dog when it is required to permit the front end of the rake to drop.

It will be understood from the foregoing taken in connection with the accompanying drawings that the invention provides a rake attachment which may be readily applied to a tractor and which, when disconnected therefrom, may be conveniently stowed away, said rake when in service being carried solely by the tractor and directed in its movements thereby.

What is claimed is:

1. In a tractor sweep rake, a main frame enclosing the tractor and having longitudinal bars, a cross brace connected to the front axle of the tractor, inverted U-shaped standards also connected to the front axle and having stirrups partially enclosing said longitudinal bars, said longitudinal bars being yieldably supported from said cross brace, and a rake pivotally mounted on said longitudinal bars.

2. A sweep rake adapted to be mounted upon a tractor and including a main frame having longitudinal bars, a bracket secured to the front axle of the tractor and disposed transversely thereof, a standard on each end of said bracket said longitudinal bars suspended from said standards and including spring connections between said standards and the longitudinal bars of the main frame.

3. A sweep rake adapted to be mounted upon a tractor and including a main frame having longitudinal bars, a bracket secured to the front axle of the tractor and disposed transversely thereof, a standard on each end of said bracket, said longitudinal bars being yieldably supported from said standard, and stirrups at opposite ends of said bracket to coact with the longitudinal bars of the main frame to limit the side movement thereof.

4. A sweep rake adapted to be mounted upon a tractor and including a main frame having longitudinal bars, a bracket attached to the front axle of the tractor and having lateral extensions including stirrups and overhanging elements, spring connections between the longitudinal bars of the main frame and the overhanging elements of the bracket, said stirrups limiting downward and sidewise movement of the longitudinal bars, a rake pivoted to the main frame, and operating means under control of the driver for tilting the rake as required.

5. A tractor sweep rake including a main frame having longitudinal bars, a bracket attached to the front axle of the tractor and having end portions straddling the front wheels and terminating in stirrups and having overhanging arms, and spring connections between the overhanging arms and the longitudinal bars of the main frame to act as shock absorbers and said stirrups operating to prevent overstraining of the springs and to limit the side movement of the main frame.

In testimony whereof I affix my signature.

CLIFFORD A. FLEMING.